United States Patent [19]

Moore

[11] Patent Number: 4,578,105
[45] Date of Patent: Mar. 25, 1986

[54] STABLE UREAFORM DISPERSION FERTILIZERS

[75] Inventor: William P. Moore, Hopewell, Va.

[73] Assignee: Hawkeye Chemical Company, Clinton, Iowa

[21] Appl. No.: 689,098

[22] Filed: Jan. 7, 1985

[51] Int. Cl.$^4$ ............................................. C05C 9/00
[52] U.S. Cl. ........................................ 71/28; 71/64.08
[58] Field of Search ................................ 71/28, 64.08

[56] References Cited

U.S. PATENT DOCUMENTS

| | | | |
|---|---|---|---|
| 3,677,736 | 7/1972 | Formaini | 71/28 |
| 3,942,970 | 3/1976 | O'Donnell | 71/28 X |
| 3,970,625 | 7/1976 | Moore et al. | 71/28 X |
| 4,033,745 | 7/1977 | Moore | 71/28 |
| 4,057,392 | 11/1977 | O'Donnell | 71/28 X |
| 4,173,582 | 11/1979 | Greidinger et al. | 71/28 X |
| 4,304,588 | 12/1981 | Moore, Jr. | 71/28 |
| 4,332,610 | 6/1982 | Sartoretto et al. | 71/28 |
| 4,409,015 | 10/1983 | Grace, Jr. | 71/28 |
| 4,526,606 | 7/1985 | Formaini | 71/28 X |

*Primary Examiner*—Ferris H. Lander

[57] ABSTRACT

A method for producing storage stable ureaform dispersion fertilizers by: reaction of urea and monomethylolurea in aqueous solution at a pH between 3.0 and 4.5 with a temperature between 25° and 75° C. until between 15 and 40 percent of the total nitrogen has been converted to form a dispersion of finely divided water insoluble ureaform particles; neutralizing; and admixing a water-insoluble, film-forming oil until the dispersed ureaform particles are coated with sufficient oil to prevent contact between the ureaform particles and the aqueous solution. The water insoluble, film-forming oils found effective include fatty acids, fatty acid esters, castor oil, castor oil esters, alkoxylated castor oils, and alkoxylated alkyl phenols. The amount of film-forming oil required to coat the ureaform particles is between 0.1 and 1.0 percent of the aqueous ureaform dispersion. To prevent settling of the coated ureaform particles a xanthan gum, or iota carrageenan thickener is added.

18 Claims, No Drawings

STABLE UREAFORM DISPERSION FERTILIZERS

BACKGROUND OF THE INVENTION

This invention relates to an improved method for the preparation of a ureaform dispersion fertilizer, and the product resulting therefrom. More particularly it relates to a new method for preparing ureaform dispersion fertilizers from urea and monomethylolurea which are stable in soluble fertilizer salt solutions.

Liquid fertilizers are usually aqueous solutions of salts of ammonium, potassium, phosphate, and nitrate ions which frequently contain dissolved urea. In recent years liquid fertilizers have been developed which contain dispersed insoluble ureaform particles to lengthen the period of time over which the nitrogen content is released as a plant nutrient.

Ureaform is a term which is used in the fertilizer art to denote mixtures of urea-formaldehyde polymers. The overall water solubility of these polymers is low thereby precluding its releasing nitrogen at a rate high enough to burn or damage vegetation. Ureaform polymers may be indicated by analysis for water insoluble nitrogen (WIN) according to the method reported in *Official Methods of Analysis of the Association of Official Agricultural Chemists*, 11th Edition, 1970. WIN is used herein to denote quantitatively the amounts of insoluble ureaform solids. Some water soluble low molecular weight urea-formaldehyde methylene compounds are also ureaform compounds by virtue of chemical structure.

Ureaform is usually produced by the acid catalyzed reaction of urea and formaldehyde, or urea and urea-formaldehyde concentrates. The reaction is also catalyzed at a slower rate by the presence of acid or alkali ions even in neutral aqueous solutions. The ureaform reaction can continue until virtually all of the formaldehyde moieties are converted to high molecular weight water insoluble ureaform solids. Stopping the conversion of ureaform at a desired level of conversion to water insoluble solids, so that appreciable amounts of the ureaform compounds remain as readily available nitrogen nutrients for plants has been the object of much of the urea-formaldehyde fertilizer art. The further reaction of ureaform solids with urea and water soluble urea-formaldehyde compounds must be substantially stopped to produce a storage stable ureaform dispersion fertilizer. The ionic content of the dispersion aqueous liquids catalyzes this further reaction and makes the required stabilization very difficult. Heretofore the efforts made at stabilization have been to change the chemical structure of the ureaform solids.

Techniques which have been used include: drying to eliminate the catalytic effects of the ionic components of a ureaform solution; introduction of extraneous moieties such as sugars or higher aldehydes into the polymer chains; and caping the polymer chains with moieties which inhibit or stop further polymerization, such as ammonia, amines, or alcohols. Another technique used has been to prepare the insoluble ureaform in two stages; the first being carried out at relatively high temperatures and high formaldehyde to urea ratios to form methylene and methylene urea polymers; and the second being reaction with additional urea at lower temperatures.

Ureaform dispersion fertilizers offer an effective and safe method for supplying nutrients to turf and ornamental and commercial crops. A ureaform dispersion fertilizer may be defined as a flowable fertilizer containing urea-formaldehyde compounds and polymers, a substantial portion of which are water insoluble solid particles, dispersed throughout the fertilizer.

The production of a liquid ureaform fertilizer containing water insoluble nitrogen was disclosed in U.S. Pat. No. 3,677,736 by Richard E. Formaini. A liquid dispersion fertilizer containing ureaform having at least 1.5 percent WIN was produced by acidifying to a pH below 5, a dilute urea-formaldehyde reaction product, and heating to a temperature between 30° and 80° C., and neutralizing. Prior to acidifying, Formaini heated the urea-formaldehyde mixture under neutral, or basic, conditions until 60 percent of the formaldehyde was in the methylene form.

In U.S. Pat. No. 4,033,745, William P. Moore discloses the stabilization of ureaform fertilizer dispersions by utilization of alcohol and sugars as polymer caping moeities to stabilize the ureaform.

Paul Sartoretto et al disclosed in U.S. Pat. No. 4,298,512 aqueous dispersions of urea-aldehyde polymers for use as liquid fertilizers. The urea-aldehyde polymers are primarily ureaform, modified by the inclusion of one or more alkyl aldehydes containing from two to four carbon atoms. Even though Sartoretto recommends the use of urea-formaldehyde concentrate plus expensive and difficult to handle acetaldehyde or propionaldehyde, the reaction mixture is still quite exothermic and difficult to control. Urea-formaldehyde concentrate is a partially reacted mixture usually containing about 60 percent by weight formaldehyde, 25 percent urea, and the remainder water. Sartoretto states that when formaldehyde is reacted with urea the urea formaldehyde dispersions formed are unstable because polymerization and cross-linking apparently continue even at neutral pH, the solids becoming aggregated and lacking in dispersibility.

In U.S. Pat. No. 4,409,015 Thomas T. Grace discloses a two-stage process for preparing an aqueous dispersion fertilizer containing ureaform WIN, wherein he teaches reaction in the first stage of 2.5 to 4.7 mols formaldehyde with 1 mol of urea at about 90° C. in the presence of an acid condensation catalyst until methylene and methyleneurea polymers have been formed of the desired length. These polymers are indicated by a special methanol solubility test indicating the intermediate to be storable for one year. Then, in the second stage the intermediate is reacted with an additional amount of urea by means of an acid catalyst until the amount of WIN is in the range of 15 to 35 percent of the total nitrogen of the system. Grace teaches substantially deactivating the formaldehyde in the first stage so that the reaction is less exothermic and easier to control in the second stage where the WIN is formed. The dispersion fertilizer product from the second stage has a preferred urea to formaldehyde mol ratio of 1.1 to 1.7 to 1. Grace further teaches the use of dicyandiamide to enhance the stability of the dispersion fertilizer by reacting with aldehyde groups present, presumably caping the WIN polymers.

Total nitrogen contents ranging between 15 and 18 percent by weight, and preferably 16 to 16.5 percent, are prescribed by Grace with the WIN preferably between 20 and 30 percent of the total nitrogen. No quantitative specification of, or reference to, unreacted urea contents are provided in U.S. Pat. No. 4,409,015. However, it is known that where methylene groups exist, particularly as polymethylene chains or methylene urea, the amount of additional urea which can be reacted is significantly lower than with non-polymerized urea and formaldehyde, or monomethylolurea. Liquid ureaform dispersion fertilizers are used commercially for turfgrasses, ornamental plants, and foliar feeding crops in areas which are long distances from locations of possible manufacture so that storage stability and concentration are important factors in the costs of shipping, and in the ultimate utility of the product. Maximum concentrations of previously disclosed liquid dispersion fertilizers are about 18 percent by weight. If one were to ship the highly storable first stage intermediate of U.S. Pat. No. 4,409,015, its shipping cost per unit of nitrogen would be high because its nitrogen content is only about 10 percent by weight.

It has long been an object of those skilled in the art to produce a ureaform dispersion fertilizer where the maximum amount of urea is protected per formaldehyde moiety used in a simple process generating little heat, from raw materials which are high in nitrogen concentrations and economical to ship and store.

It is therefore an object of this invention to provide a method of preparing a storage stable ureaform dispersion fertilizer containing economically significant amounts of water insoluble nitrogen (WIN).

It is a further object of this invention to provide an easily controlled method of reacting urea to ureaform dispersion fertilizers using minimum amounts of formaldehyde moieties.

It is another object of this invention to provide a ureaform dispersion fertilizer which does not solidify or settle during extended periods of storage.

It is still another object to provide a ureaform dispersion fertilizer which may be blended with other plant nutrients, such as phosphate and potash to form storage stable complete liquid fertilizers.

SUMMARY OF THE INVENTION

I have found that a storage stable ureaform dispersion fertilizer can be prepared in an easily controlled method, whereby urea is reacted with monomethylolurea in acid solution to form a dispersion of finely divided water insoluble ureaform particles, the acid is then neutralized, and a water insoluble, film-forming oil is admixed to coat the dispersed ureaform particles with sufficient oil to prevent contact between the particles and the aqueous solution, thereby preventing catalysis of further reaction of the solids by the acid ions in the aqueous solutions.

The dispersion fertilizer containing the oil protected ureaform particles may be blended with thickeners to prevent settling of the particles or blended with other plant nutrient salts to produce complete liquid fertilizers and stored without further reaction of the ureaform solids.

According to the present invention, a method for producing a storage stable ureaform dispersion fertilizer comprises five steps listed as follows: (1) admixing between 1 and 3 mols of urea per mol of monomethylolurea in water to form an aqueous solution containing between 10 and 20 percent total nitrogen by weight; (2) acidifying the aqueous solution to a pH between 3.0 and 4.5 by admixing a mineral acid; (3) maintaining the acidified solution at a temperature between 25° and 75° C. until the urea and monomethylolurea have reacted sufficiently to form a dispersion of water insoluble ureaform particles containing between 15 and 40 percent of the total nitrogen of the acidified solution; (4) neutralizing the aqueous dispersion to pH 6.5 to 7.5 by admixing an acid neutralizing material; and (5) admixing a water insoluble, film-forming oil with the aqueous dispersion until the dispersed ureaform particles are coated with an amount of oil sufficient to prevent contact between the ureaform particles and the aqueous solution.

DETAILED DESCRIPTION OF THE INVENTION

The method of the present invention employs five stages which may be carried out in a rather simple reaction vessel which would normally be equipped with a centrifugal circulating pump and a heat exchanger through which the reaction mixture is circulated. No special, or unusual, equipment is required because of the simplicity of the method. The agitation and mixing provided by an effective circulating pump is usually sufficient although a mechanical mixer and a jacketed reaction vessel may also be effectively used.

The reaction of monomethylolurea with free urea was found to be the most effective method for utilizing formaldehyde moieties to convert the maximum amounts of urea to ureaform compounds. For example, when a two-stage method is used to condense formaldehyde and urea by first forming methylene-methylene urea polymers at high formaldehyde to urea ratios, and then reacting with additional urea to form a ureaform liquid containing about 25 percent of its nitrogen as WIN, at an overall urea to formaldehyde moiety ratio of 1.7, the free urea amounted to 38 percent of the total nitrogen content of the dispersion fertilizer. Using the same moiety ratio and simply reacting monomethylolurea with urea to convert 25 percent of the total nitrogen, free urea amount to only 22 percent of the total nitrogen. The undesirable free urea was thus reduced by 42 percent while maintaining the same WIN.

Monomethylolurea and urea may be admixed with water as pure chemical or technical compounds. They may also be prepared "in-situ" by reaction of urea and formaldehyde so long as the methylolurea and urea are formed in the desired mol ratio and in the concentrations required to produce the necessary total nitrogen content. It is also necessary that other methylene and methylol compounds amount to less than 10 percent by weight of the nitrogen.

Surprisingly, mechanically isolating the ureaform particles by coating them with a layer of water insoluble oil was found to be effective in preventing the further reaction of those ureaform molecules to form high molecular weight polymers which can form molecular networks throughout the liquid to such an extent that it becomes quite viscous, or it completely solidifies. Besides preventing the physical degradation of the ureaform liquids, the small amount of oil coating used in the method of the present invention prevents further polymerization to produce polymers which have a low nutrient availability.

For the method of this invention to be effective in producing a storage stable ureaform dispersion fertilizer it is necessary that the five steps be performed as defined in the following paragraphs.

First, between 1 and 3 mols of urea per mol of monomethylolurea must be mixed in water to produce an aqueous solution containing between 10 and 20 percent total nitrogen by weight. It was found that less than 1 mol of urea per mol of monomethylolurea, produced a dispersion fertilizer which was low in availability to plants, and when more than 3 mols of urea was used per mol of monomethylolurea, the free urea in the ureaform product was high enough to cause some burning of foliage when applied to bluegrass in hot, dry weather at normal rates of 1 pound N/1000 ft$^2$. To convert appreciable amounts of a 20+percent total nitrogen solution, for example, 25 to 35 percent, was found to produce a dispersion fertilizer which was too viscous to handle effectively. Those viscous liquids were almost like solids at typical fall and spring ambient temperatures. When nitrogen contents were lower than 10 percent by weight, it was difficult to produce stable suspensions of the ureaform particles. The method performed best when between 1.3 and 1.7 mols of urea per mol of monomethylolurea were mixed in water to form an aqueous solution containing between 14 and 18 percent total nitrogen. It was found that dimethylol-, and trimethylolurea did not perform well in this invention. They behaved about like urea-formaldehyde concentrate by exothermically reacting with urea in a manner difficult to control, forming water insoluble ureaform particles having poor storage stability.

Second, it is necessary to acidify the aqueous solution to a pH between 3.0 and 4.5 by adding and mixing a mineral acid. Although mineral acids were generally effective in that pH range, best results were obtained when pH was held between 3.8 and 4.2 by using nitric, sulfuric, phosphoric, superphosphoric or hydrochloric acid, or mixtures of them. Nitric acid was effective and provided a small amount of desirable nitrate in the dispersion fertilizers. Likewise, the sulfuric and phosphoric acids also provided desirable nutrients.

Third, it is necessary to maintain the acidified solution at a temperature between 25° and 75° C. until the urea and monomethylolurea have reacted sufficiently to form a dispersion of water insoluble ureaform particles containing between 15 and 40 percent of the total nitrogen of the acidified solution. At temperatures below 25° C. the ureaform reaction rate was found to be too slow for commercial practicality and at temperatures above 75° C., the ureaform solids formed were high polymers having low plant nutrient availability. Preferred reaction temperature was found to be 45° to 55° C. which allowed a practical reaction time to form an aqueous dispersion of water insoluble ureaform particles containing between 20 and 30 percent of the total nitrogen of the acidified solution.

Fourth, after maintaining the acid reaction conditions it is necessary to neutralize the dispersion to a pH of 6.5 to 7.5 by adding and mixing a base, and the stability of the product was improved further when pH was held between 6.8 and 7.2. The bases found most effective were ammonia, alkali metal hydroxides, alkali metal carbonates, alkaline earth oxides, alkaline earth carbonates, and alkanolamines.

Fifth, it is key to the success of the method of this invention to add to the dispersion of water insoluble ureaform particles, a water insoluble, film-forming, oil and to mix it until the particles are coated with sufficient oil to substantially prevent contact between those suspended ureaform particles and the aqueous solution which contains the ions which act as a catalyst to continue the reaction to form low availability, high molecular weight ureaform polymers. To be effective the oils must be capable of forming a continuous, thin, water insoluble film over the surface of the insoluble ureaform particles which substantially prevent the passage of aqueous ions, such as phosphate, sulfate and nitrate. If large amounts of oil were required, the system would be unsuitable because the oil could cause plant phytotoxicity, application problems, and poor economics.

Drying oils were found to be ineffective because they allowed passage of the catalyst ions and subsequent increases in viscosity and solidification after relatively short storage periods. To prevent these coating oils from sinking to the bottom or rising to the surface of the liquid it was necessary that their specific gravity be between 0.9 and 1.2. To facilitate the complete coating of the ureaform solids it was found necessary that the pour point of the oil be between −30° and 0° C.

Coating oils found to be particularly effective were fatty acids, fatty acid esters, castor oil, alkoxylated castor oils, castor oil esters, and alkoxylated alkylphenols. These particular coating oils were found to have a special affinity for the dispersed ureaform particles and effectively coated them. Their speed of coating the particles was enhanced by addition of nonionic surfactants. Cationic or anionic surfactants were unsuitable, causing polymerization and destabilization of the fertilizer dispersion.

The coating oils need not be chemically pure compounds. The chemical compound comprising a large portion of castor oil is glyceryl trihydroxyoleate. Fatty acid compounds found to be suitable comprised commercial grades of ricinoleic acid, oleic acid and hydroxyoleic acid. Castor oil esters found suitable comprised commercial grades of methyl ricinoleate, butyl ricinoleate, and glyceryl triacetyl ricinoleate. The alkoxylated castor oils found useful in the present invention included commercial grades of ethoxylated ricinoleic acid containing from 1 to 6 mols ethylene oxide per mol of ricinoleic acid. When more than 6 mols of ethylene oxide is included, the water solubility of the coating oil is too high, allowing the passage of the reaction catalytic ions to the surface of the ureaform particles. Alkoxylated castor oil which contains between 1 and 6 mols of propylene oxide is as effective as the ethoxylated castor oil.

Alkoxylated alkylphenol compounds which were found to perform as effective coating oils included nonylphenol alkoxylated with between 3 and 8 mols of ethylene or propylene oxide per mol of nonylphenol.

For successful performance of the method of this invention it is necessary to accurately admix small amounts of the coating oil. It was found that satisfactory stabilization of the ureaform dispersion fertilizer could be obtained with oil amounting to between 0.05 and 1.00 percent by weight of the aqueous ureaform dispersion. Further, it was found that the addition of a small amount of nonionic surfactant, between 0.02 and 0.08 percent, to the coating oil increases the speed of its coating of the dispersed ureaform particles.

Although their use is not required in the method to produce stable ureaform dispersion fertilizers, addition of thickening agents to the dispersions of this invention drastically decreases the rate of settling of the oil-film coated ureaform particles to the point where they stay suspended in a substantially homogeneous dispersion for periods of three to six months. It was found that the thickener could be added to the dispersion prior to the admixing of the coating oil, and that method was preferable, when a surfactant was added with the oil, to preclude foaming when the thickener was mixed with the dispersion.

Thickening agents do not take part in protecting the dispersed ureaform from further reaction, but simply increase viscosity in the dispersion to reduce settling rates. Although settling of the ureaform particles coated with the oil film does occur in several days, the particles remain stable, do not agglomerate, and may be resuspended by gentle agitation.

Thickening agents found to be particularly effective in suspending the oil coated ureaform particles dispersion fertilizers were iota carrageenan, and xanthan gum. The amounts of these agents required for effective use in this method were low, with larger amounts required where dispersed ureaform particles comprised less than 3 percent by weight nitrogen. When those particles amounted to more than 7 percent, very low thickener concentrations were required because of the inherent viscosity of the dispersion. The range of thickener concentrations which were found to perform satisfactorily in the method of this invention was between 0.03 and 1.00 percent by weight of the dispersion fertilizer, and preferably between 0.06 and 0.10 percent.

Iota carrageenan is a high molecular weight extract from Rhodophyceaea (Red Algae). It contains repeating galactose units joined by 1–3, and 1–4 glycosidic linkages and has a molecular weight between 100,000 and 500,000. It is marketed under the trade name Gelcarin-DG by FMC Corporation.

Xanthan gum is a high molecular weight natural carbohydrate, specifically a polysaccharide, and may be defined as an exocellular biopolysaccharide produced in a pure culture fermentation process by the microorganism *Xanthomonas Campestris*. Xanthan gum is marketed under the trade name of Kelzan by Merck and Company.

When the ureaform particles were coated with the oil film, the ureaform dispersion, which is essentially a nitrogen fertilizer, could be converted to a complete fertilizer by adding other nutrients without destroying the dispersion stability. Although phosphate, and potassium plant nutrients are used in the form of nearly neutral salts, they ionize to form ions in aqueous solution which would ordinarily catalyze the further polymerization of ureaform dispersions during storage to solidify the liquid dispersion, unless the dispersed particles are protected. Potassium chloride, potassium sulfate, potassium phosphate, diammonium phosphate, monoammonium phosphate, and ammonium polyphosphate were added to the ureaform dispersions of this invention to form liquid suspension fertilizers frequently produced and stored for use in the custom lawm treating industry. Analyses of these fertilizers prepared included: 14%N-3%$P_2O_5$-6%$K_2O$ and 16%N-3%$P_2O_5$-3%$K_2O$.

It was found that an aqueous ureaform dispersion could be prepared by the method of this invention which was very effective as a liquid fertilizer for application to turfgrass on the soil and foliage and as a foliar feed for commercial and ornamental plants.

The best mode of operating the present invention is described in greater detail in the specific examples which follow. In these examples all temperatures are in degrees Celsius and all parts and percentages are by weight unless stated to be otherwise.

EXAMPLE 1

To a round bottom flask equipped with an electric heating mantle, a magnetic stirrer, a thermometer, and openings for a pH electrode and for the addition of materials were added ingredients in the amounts listed as follows: water, 440 grams; monomethylolurea, 388 grams; and urea, 172 grams. The liquid mixture was hazy when it was blended and cooled to a temperature of 15° C. Concentrated sulfuric acid was diluted with distilled water to produce a 10 percent sulfuric acid concentration. This acid was added until the pH of the well-mixed liquid was 4.0. Heat was then applied with the heating mantel until temperature of the liquid reached 50° C.

Agitation was continued for 90 minutes while temperature was maintained at 50° C. with alternating air cooling of the flask, and electrical heating. The pH of the liquid was maintained at 4.0 throughout the 90 minute period of reacting the urea and monomethylolurea. During the early part of the reaction period, the liquid was clear, but it started to cloud after about 45 minutes. The liquid had a creamy white appearance caused by the presence of finely divided, water insoluble ureaform particles. During the reaction period, no temperature rises were observed, and at the end of the period, pH was adjusted to 7.0 by the dropwise addition of aqueous 20 percent potassium hydroxide, and the temperature of the reaction mixture was reduced to 23° C. by removing the heating mantle from the flask and replacing it with a water bath.

While agitation of the aqueous ureaform dispersion was continued with the magnetic stirrer, 1 gram of castor oil was added and agitation was continued until the ureaform particles were evenly coated with the castor oil. The dispersion fertilizer was sampled and stored in closed bottles. Analyses showed the total nitrogen content to be 19.7 percent. The total water insoluble nitrogen (WIN) content was 4.7 percent and the hot water insoluble nitrogen (HWIN) content was 0.8 percent. Free urea nitrogen content was 5.7 percent, and the water soluble methylene urea nitrogen calculated by difference was 9.3 percent.

The retained samples were shaken for 30 seconds and viscosity was determined by a Brookfield viscosimeter at 20° C. and 25 rpm to be 85 centipoise. When the samples were stored, some settling occurred after 7 days and about half of the liquid was clear after 2 months storage. When the samples were shaken lightly after 2 months storage, the coated ureaform particles were easily evenly re-dispersed throughout the liquid with no solids remaining on the bottom of the container. Viscosity was determined to be 88 centipoise. The same redispersal was done after 6 months storage and the viscosity was found to be 84 centipoise, indicating that the ureaform particles were storage stable and that they were not reacted or polymerized further. Analysis on the stored product was again performed after 6 months storage, with total nitrogen amounting to 19.8 percent, WIN 4.8 percent, and HWIN 0.8 percent, further confirming the storage stability of the ureaform dispersion.

EXAMPLE 2

A 200 gram sample of the freshly prepared product from Example 1 was retained. To this sample was added 0.1 gram of iota carrageenan, purchased commercially as Gelcarin-DG. The mixture was stirred with the magnetic stirrer for 30 minutes and the Brookfield viscosity at 20° C., measured at 20 rpm was found to be 160 centipoise. The stabilized ureaform dispersion fertilizer showed no sign of settling after 6 months storage and viscosity was 175 centipoise. The WIN remained 4.8 and the HWIN was 0.8 percent.

EXAMPLE 3

To a 15,000 gallon capacity stainless steel tank equipped with an external heat exchanger for heating with steam and cooling with water, a centrifugal pump for recirculating, an agitator, a temperature sensor and recorder, an in-line pH meter, and nozzles for introducing fluids, was added 13,830 lbs water and 26,915 pounds of a buffered commercially marketed solution, containing 30% N and 2% $K_2O$, comprising monomethylolurea and urea, having a composition as follows:

| Component | Wt % |
|---|---|
| Monomethylolurea | 47.1 |
| Methylenediurea | 1.9 |
| Urea | 30.0 |
| Ammonia | 1.0 |
| Potassium bicarbonate | 4.2 |
| Water | 15.8 |

The mol ratio of urea to monomethylolurea in the reactor charge was 1.05 and the nitrogen concentration was 19.8 percent. Into the circulating aqueous monomethylolurea and urea, nitric acid at 55 percent concentration was added. Carbon dioxide effervesced from the solution until the pH had decreased below 5. Nitric acid addition was continued until the pH was decreased to 3.6, and amounted to 3825 lbs. Steam was applied to the systems heat exchanger to increase the temperature of the reaction mixture to 60° C. The temperature was maintained at 60° C. for 30 minutes with very little cooling. During this reaction period, the pH tended to increase so that an additional 2055 lbs of 55% nitric acid was added to maintain pH between 3.6 and 4.0. The clear initial reaction mixture started to cloud after about 10 minutes and had a creamy white consistency after 30 minutes, when the pH was brought to 6.7 by introducing 1415 lbs of 45 percent potassium carbonate solution. Aqueous 50 percent urea was added, amounting to 1850 lbs while maximum cooling was applied at the same time to bring the temperature down to 25° C.

To the resulting aqueous dispersion of ureaform solids was added 50 pounds of xanthan gum (Kelzan by the Kelco Division, Merck, Inc.) through an eductor located on the inlet side of the centrifugal circulating pump. After allowing 15 minutes for the hydration and blending of the xanthan gum thickener, 2 lbs of the commercial nonionic surfactant Citowett, produced by BASF, was added. To the resulting mixture 60 lbs of commercial oleic acid was added as a water insoluble film-forming coating oil, and allowed to mix for 15 minutes to coat the surfaces of the dispersed ureaform particles.

The product was pumped to a storage tank, sampled and analyzed. Total nitrogen content was 17.9 percent, free urea was 5.9 percent, nitrate N was 0.9 percent, WIN was 4.6 percent, and HWIN was 1.4 percent. Potassium content was 1.9 percent as $K_2O$. Viscosity of the product pumped to storage was 210 centipoise.

A 50-gallon drum of the product was retained as a sample and the remainder was used commercially as a low burn fertilizer for lawns, after being blended with water, ammonium polyphosphate, and potassium chloride to form a 14-3-3 liquid concentrate.

After 3 months storage the material from the 50-gallon drum contained 4.7 percent WIN and 1.4 percent HWIN, and viscosity was 225 centipoise. There was no separation of the coating oil.

EXAMPLE 4

To a stirred stainless steel reaction tank, equipped with a recirculating pump, temperature indicator, and a pH probe, was charged 2025 pounds of the same commercial monomethylolurea and urea solution used in Example 3 and 1000 pounds of water. Agricultural grade green phosphoric acid (0-54-0) was added to reduce the pH from an initial level of 9.6 to 4.0. $CO_2$ effervescence occurred until a pH of about 5 was reached. The amount of acid required to bring the pH down was 435 pounds. Live steam was then injected directly into the reaction mixture until temperature of the agitated mixture reached 57° C. in 7 minutes. The mixture was then allowed to react for 21 minutes with the pH varying from 4.0 to 4.5, with 48 pounds additional phosphoric acid added in two additions to keep pH below 4.6. No cooling was used during the reaction period, and the temperature increased slightly to 62° C. At the end of the reaction period, the pH was brought to 6.8 by the addition of 155 pounds of potassium carbonate. Virtually no temperature change was observed during the neutralization. Significant $CO_2$ effervescence was observed. Water amounting to 1120 pounds, 155 pounds of potassium chloride, and then 1044 pounds prilled urea were added, quickly cooling the reaction mixture to 38° C. The reaction product was a light gray colored dispersion. Iota carrageenan (Gelcarin-DG) thickener amounting to 1.8 pounds was blended into the reaction mixture.

To the stirred, thickened, ureaform dispersion was added 3.6 pounds of glyceryl monoricinoleate (marketed as Flexrin 13 by Cas Chem, Inc.) and 1.0 pound of a nonionic surfactant (Cittowett marketed by BASF). After the mixture was stirred 15 minutes to assure complete coating of the dispersed ureaform particles, the product was sampled and stored.

Analyses showed the product to initially contain 18.8% total N, 3.3% WIN, 1.3% HWIN, 4.2% $P_2O_5$, and 3.6% $K_2O$. Viscosity was 110 centipoise. The stored product was used as a low burn, long lasting dispersion fertilizer for injection around the roots, and as a foliar feed for vegetables. The retained sample after 3 months had a viscosity of 140 centipoise and the analyses were substantially unchanged.

EXAMPLE 5

The product from Example 3 (analyzing 17.9% N-0% $P_2O_5$-1.9% $K_2O$) was blended with ammonium polyphosphate solution (10-34-0) and soluble potassium chloride (0-0-62) to produce a complete fertilizer concentrate comprising 14% N-3% $P_2O_5$ and 3% $K_2O$. This concentrate was stored for 3 months with the ureaform particles remaining substantially dispersed, with viscosity increasing slightly from 210 centipoise to 225 centipoise during that period.

The concentrate was diluted with water until the nitrogen concentration was decreased to 4 percent. The dispersed ureaform particles remained stable, but they settled out after about 1 hour. They were re-dispersed by mild agitation.

The diluted dispersion fertilizer was applied to bluegrass turf at the rate of 1 lb N per 1000 $ft^2$ and gave a good increase in grass vitality with no burn or damage to the foliage.

I claim:

1. A method for producing storage stable ureaform dispersion fertilizers comprising:
   (a) admixing between 1 and 3 mols of urea per mol of monomethylolurea in water to form an aqueous solution containing between 10 and 20 percent total nitrogen by weight;
   (b) acidifying the aqueous solution to a pH between 3.0 and 4.5 by admixing a mineral acid;
   (c) maintaining the acidified solution at a temperature between 25° and 75° C. until the urea and monomethylolurea have reacted sufficiently to form a dispersion of water insoluble ureaform particles containing between 15 and 40 percent of the total nitrogen of the acidified solution;
   (d) neutralizing the aqueous dispersion to a pH of 6.5 to 7.5 by admixing a base;
   (e) and admixing a water insoluble, film-forming oil with the aqueous dispersion until the dispersed ureaform particles are coated with an amount of oil sufficient to substantially prevent contact between the ureaform particles and the aqueous solution.

2. The method of claim 1 wherein between 1.3 and 1.7 mols of urea per mol of monomethylolurea are admixed in water to form an aqueous solution containing between 14 and 18 percent total nitrogen by weight.

3. The method of claim 1 wherein the solution is acidified to a pH between 3.8 and 4.2 by admixing a mineral acid.

4. The method of claim 1 wherein the aqueous solution is acidified by admixing a mineral acid selected from the group consisting of: nitric acid, sulfuric acid, phosphoric acid, and superphosphoric acid.

5. The method of claim 1 wherein the acidified solution is maintained at a temperature between 45° and 55° C. for a period of time between 45 and 90 minutes until the urea and monomethylolurea have reacted sufficiently to form an aueous dispersion of water insoluble ureaform particles containing between 20 and 30 percent of the total nitrogen of the acidified solution.

6. The method of claim 1 wherein the aqueous dispersion is neutralized to a pH between 6.8 and 7.2 by admixing a base selected from the group consisting of ammonia, alkali metal hydroxides, alkali metal carbonates, alkaline earth oxides, alkaline earth carbonates, and alkanolamines.

7. The method of claim 1 wherein the water insoluble, film-forming oil is a non-drying oil having a specific gravity between 0.9 and 1.2, and a pour point between −30° and 0° C.

8. The method of claim 1 wherein the water insoluble, film-forming oil is selected from the group consisting of fatty acids, fatty acid esters, castor oil esters, castor oil, alkoxylated castor oils, and alkoxylated alkylphenols.

9. The method of claim 1 wherein the water insoluble film-forming oil amount to between 0.05 and 1.00 percent by weight of the aqueous ureaform dispersion.

10. The method of claim 1 wherein a nonionic surface active agent amounting to between 0.02 and 0.08 percent by weight is added to the water insoluble, film-forming oil to increase the speed of its coating of the dispersed ureaform particles.

11. The method of claim 1 wherein a thickening agent amounting to between 0.03 and 1.00 percent by weight is added to the aqueous ureaform dispersion to decrease the rate of settling of the oil-film coated particles.

12. The method of claim 11 wherrein the thickening agent is admixed with the aqueous dispersion prior to admixing the water insoluble, film-forming oil.

13. The method of claim 1 wherein a thickening agent is admixed with the aqueous ureaform dispersion to suspend and prevent settling of the oil-film coated ureaform particles, the thickening agent being selected from the group consisting of xanthan gums, and iota carrageenan.

14. The method of claim 1 wherein phosphate and potassium plant nutrients are admixed with the oil-coated, dispersed ureaform particles and the aqueous solution to form a complete liquid fertilizer.

15. A storage stable aqueous ureaform dispersion fertilizer product prepared by the method of claim 1.

16. A method for producing storage stable aqueous ureaform dispersion fertilizers comprising:
   (a) admixing between 1.3 and 1.7 mols of urea per mol of monomethylolurea in water to form an aqueous solution containing between 14 and 18 percent total nitrogen by weight;
   (b) acidifying the aqueous solution to a pH between 3.8 and 4.2 by admixing aqueous nitric acid;
   (c) maintaining the acidified solution at a temperature between 45° and 55° C. for a period of time between 45 and 90 minutes until the urea and monomethylolurea have reacted sufficiently to form an aqueous dispersion of finely divided water insoluble ureaform particles containing between 20 and 30 percent of the total nitrogen of the acidified solution;
   (d) neutralizing the aqueous dispersion to a pH between 6.8 and 7.2 by admixing ammonia;
   (e) cooling the neutralized aqueous dispersion to a temperature between 10° and 40° C.;
   (f) admixing a water insoluble, film-forming oil comprising a propoxylated castor oil containing between 1 and 6 mols propylene oxide per mol of ricinoleic acid, and amounting to between 0.06 and 0.10 percent by weight of the aqueous ureaform dispersion;
   (g) and admixing a thickening agent comprising iota carrageenan amounting to between 0.04 and 0.07 percent by weight of the ureaform dispersion.

17. The method of claim 16 wherein the thickening agent is admixed with the aqueous dispersion prior to admixing the water insoluble film-forming oil.

18. A storage stable aqueous ureaform suspended dispersion fertilizer prepared by the method of claim 16.

* * * * *